3,062,764
AQUEOUS COATING COMPOSITION COMPRISING POLYTETRAFLUOROETHYLENE, POLYORGANOSILOXANE AND AN ACRYLIC TRIPOLYMER AND SUBSTRATA COATED THEREWITH
Le Verne K. Osdal, Springfield, Pa., assignor to E. I. du Pont de Nemours and Company, Wilmington, Del., a corporation of Delaware
No Drawing. Filed Apr. 13, 1959, Ser. No. 805,702
7 Claims. (Cl. 260—29.3)

This invention relates to coating compositions and to articles coated therewith. More particularly, this invention relates to modified aqueous polytetrafluoroethylene coating compositions which are especially suitable for coating electrical conductors.

Because of its outstanding heat, chemical and electrical resistance, polytetrafluoroethylene has found wide use in recent years. One convenient method for applying polytetrafluoroethylene to substrates is to form an aqueous dispersion thereof, coat the substrates with the resulting dispersion, dry the resulting product and heat the dried product at elevated temperatures to fuse the polytetrafluoroethylene. However, the application of polytetrafluroethylene from aqueous dispersions has presented several problems. First, to be commercially practical, aqueous coating compositions of polytetrafluoroethylene should be capable of being applied in one pass in thick films, for example, at dry-film thicknesses of ½ to 1 mil or more. However, thick films formed from aqueous dispersions of polytetrafluoroethylene develop cracks, often called "mud cracks," when they are dried and fused. Obviously, such cracking adversely affects the chemical and electrical resistance of such coatings.

Various modifiers have been added to coating compositions comprising aqueous dispersions of polytetrafluoroethylene to reduce cracking in coatings thereof and thus allow the application of thick coatings; however, heretofore modification of coating compositions formed from aqueous dispersions of polytetrafluoroethylene with known additives has always been coupled with a sacrifice in one or more of the other desirable properties of such compositions such as, for example, a sacrifice in heat, chemical, electrical or abrasion resistance or coating uniformity. For example, modifiers such as polyacrylates allow the application of thick films with a minimum of cracking; yet, such coatings are relatively soft and often have poor heat, chemical and electrical resistance.

The aforementioned problems become particularly acute with wire coating compositions. For example, compositions which form heat-, chemical-, electrical- and abrasion-resistant coatings on flat metal substrates often form coatings varying widely in thickness when, as is conventional in the art, they are dip coated on wires at high speeds.

I have found a coating composition comprising an aqueous dispersion of polytetrafluoroethylene which can be applied to substrates in thick uniform coatings without cracking and which have excellent heat, chemical, electrical and abrasion resistance.

The coating compositions of this invention comprise an aqueous dispersion having as essential film-forming constituents 100 parts by weight of a blend of (A) at least about 65, and preferably at least about 75 parts by weight of polytetrafluoroethylene, (B) about from 3 to 30, and preferably 5 to 10 parts by weight of water-dispersible, heat-reactive silicone resin and (C) about from 2 to 15 and preferably 3 to 10 parts by weight of at least one copolymer of at least one ester of a monoethylenically unsaturated monocarboxylic acid bearing an alpha-methylene group, at least one nitrile of such an acid and at least one alpha-monoethylenically unsaturated monocarboxylic acid. Preferably, the aforementioned silicone resins are present as an emulsified solution in water-immiscible organic solvent.

The polytetrafluoroethylene used in the compositions of this invention is in the form of finely divided particles which are dispersible in water. Aqueous dispersions of polytetrafluoroethylene useful in this invention are described, for example, in U.S. Patent No. 2,534,058. Concentrated aqueous colloidal dispersions of polytetrafluoroethylene, such as those described in U.S. Patent No. 2,478,229, are particularly preferred as raw materials for preparing the compositions of this invention.

The second essential constituent of the products of this invention is a water-dispersible, heat-reactive silicone resin. "Water-dispersible" as used herein refers to resins which form stable dispersions or emulsions in water, either per se or as solutions in water-immiscible organic solvents. "Heat-reactive" refers to resins which, when they are deposited on substrates and heated, for example, at temperatures from 100 to 400° C. form smooth continuous films which are substantially insoluble in solvents for the starting materials. These silicone resins are poly(organosiloxanes) containing the recurring structural unit:

wherein R and R' represent hydrocarbon radicals. Alkyl-aryl silicones, that is, silicone resins in which R and R' represent alkyl and aryl radicals, respectively, are preferred. Methyl-aryl silicone resins, especially methyl-phenyl silicone resins, containing on the order of 1 to 2 hydrocarbon substituents per silicon atom and about from 0.5 to 2 methyl substituents per aryl substituent are particularly preferred. Water-dispersible, heat-reactive silicone resins of the type described above and the process by which they are prepared are described, for example, in U.S. Patent No. 2,258,222. Readily commercially available resins of the type used in this invention are those supplied under the designations DC–801, DC–803, DC–805, DC–806, DC–840; those supplied under the designations SR–82, SR–112, SR–02, SF–69 and 81727, and those supplied under the designations R–62 and R–64.

As stated hereinbefore, the compositions of this invention contain about from 3 to 30 parts by weight per 100 parts of essential film-forming constituents of the aforementioned silicone resins. If less than about 3 parts by weight are used, thick, crack-free films of the compositions cannot be prepared. Also, sometimes the resulting products are somewhat porous. If greater than about 30 parts by weight of silicone resin are used in the compositions, the toughness and abrasion resistance of coatings formed therefrom is impaired.

The third essential constituent of the compositions of this invention is at least one copolymer of at least one ester of a monoethylenically unsaturated monocarboxylic acid bearing an alpha-methylene group, at least one nitrile of such an acid and a minor portion, for example, 15% or less of at least one alpha-monoethylenically unsaturated monocarboxylic acid. Examples of esters of monoethylenically unsaturated monocarboxylic acids bearing an alpha-methylene group are methyl acrylate, methyl methacrylate, methyl ethacrylate, ethyl alpha-phenylacrylate, isopropyl acrylate, n-butyl methacrylate, cyclohexyl acrylate, octyl acrylate, lauryl methacrylate, stearyl acrylate, benzyl methacrylate, ethylene glycol monoethyl ether acrylate, diethylene glycol monoethyl ether acrylate and mixtures thereof. Acrylic and methacrylic acid esters of 1- to 8-carbon atom alkanols are preferred. Examples of nitriles of the aforementioned acids which can be used in preparing the copolymers are acrylonitrile, methacrylonitrile, ethacrylonitrile, alphapropylacrylonitrile and the like. Acrylonitrile is preferred. Examples of alpha-monoethylenically unsaturated monocarboxylic acids which can be used in preparing the aforementioned copolymers are acrylic acid, methacrylic acid, alpha-ethylacrylic acid, alpha-phenyl acrylic acid, beta-phenyl acrylic acid, crotonic acid, isocrotonic acid, beta,beta-dimethyl acrylic acid, angelic acid, tiglic acid, isohydrosorbic acid, beta-ethyl acrylic acid and mixtures thereof. Acrylic and methacrylic acid are preferred.

Small portions, for example, up to 25% by weight based on the total weight of copolymerizable monomers, of other auxiliary ethylenically unsaturated monomers can also be used. Such auxiliary monomers include, for example, styrene, alpha-methyl styrene, vinyl toluene and various glycidol derivatives such as allyl glycidyl ether and glycidyl esters such as glycidyl methacrylate, glycidyl acrylate and the like.

Copolymers containing about from 15 to 65% by weight of at least one ester of a monoethylenically unsaturated monocarboxylic acid bearing an alpha-methylene group, particularly acrylic and methacrylic acid, with a 1- to 8-carbon atom alkanol, about from 30 to 80% by weight of acrylonitrile and about from 2 to 15% by weight of at least one monoethylenically unsaturated monocarboxylic acid bearing an alpha-methylene group, especially acrylic and methacrylic acid, are particularly preferred. Copolymers of the type used in this invention and the method by which they are prepared are described, for example, in U.S. Patent No. 2,753,318 and U.S. application Serial No. 369,890, filed July 23, 1953.

Copolymers in which the free carboxyl groups have been at least partially neutralized with a volatile base, for example, with ammonium hydroxide or with volatile organic alkaline materials such as, for example, monoethanol amine, triethanol amine and butyl amine, methylamine, dimethylamine, trimethylamine, morpholine or picoline are preferred. Usually, at least about 10%, and preferably about 50 to 100% of the free carboxyl groups on the copolymers are neutralized. The neutralization can be carried out by adding sufficient base to an aqueous dispersion of the copolymer to raise the pH of the dispersion to about from 5.5 to 8.0, heating the resulting dispersion at a temperature of about 45 to 95° C. for about 5 minutes to 4 hours, then cooling the resulting product to a temperature below about 30° C. If heat-reactive formaldeyhde condensation resin is to be added to the compositions of this invention as described hereinafter, preferably enough base is added to raise the pH to about 5.5 to 6.5. Next, the heat-reactive formaldehyde condensation resin is added, then more base is added to bring the pH of the dispersion to about from 6.7 to 7.5. Finally, the resulting dispersion is heated to about from 65 to 90° C. for about from 15 to 120 minutes, then cooled to below 30° C. Copolymers neutralized as described above are referred to hereinafter as "at least partially neutralized copolymers." This type of polymers is described, for example, in U.S. Patent No. 2,866,763.

As stated hereinbefore, the compositions of this invention must contain about from 2 to 15% by weight of the aforementioned copolymers. If less than about 2 parts by weight are used, the resulting coating compositions form films which vary greatly in thickness, particularly when they are used as wire coating compositions. If greater than about 15 parts by weight of copolymer are used, the resulting products have greatly decreased heat, chemical and electrical resistance.

If portions of copolymers approaching the upper limit are used, preferably, portions of silicone resin approaching the lower limits thereof, for example, on the order of 5 parts per 100 parts by weight of the essential film-forming constituents, are used and vice versa.

Various optional additives may be used in the compositions of this invention. One preferred group of additives are water-dilutable, heat-reactive formaldehyde condensation resins. Such resins include those formed by the condensation of phenols, urea, melamine or combinatons thereof with formaldehyde. They include, for example, phenol-formaldehyde, urea-formaldehyde, melamine-formaldehyde and urea/melamine-formaldehyde resins. "Water-dilutable" as used herein refers to formaldehyde condensation resins which are soluble in water or to liquid resins or finely ground solid resins which can be colloidally dispersed in water. Preferably the resins are water soluble and have a molecular weight of less than about 5,000. Formaldehyde condensation resins of the type described above and the method by which they are prepared are shown, for example, in U.S. Patent No. 2,825,706. Usually, about from up to about 40%, and preferably about from 5 to 20% based on the weight of the aforementioned ester-nitrile-acid copolymers are used.

Examples of pigments and extenders which can be added to the compositions of this invention in conventional amounts are metal oxides, hydroxides, chromates, silicates, sulfides, sulfates, carbonates, carbon blacks, organic dyes and lakes thereof and metal-flake pigments which will withstand the baking temperatures used for the coating compositions. Other additives which can be added in conventional amounts are dispersing agents such as, for example, sodium lauryl sulfate, lauryl pyridine chloride, polyethyleneether and polypropyleneether esters of hydrophobic fatty acids, colloidal silica, anionic organic phosphates, montmorillonite, the reaction product of 12 to 13 moles of ethylene oxide with 1 mole of octyl phenol and secondary sodium alkyl sulfates; bodying agents such as polyisobutylene, methyl cellulose, ammonium alginate, high molecular weight carboxyvinyl polymers, magnesium montmorillonite and dimethyl dioctadecyl ammonium bentonite; flow-control agents; coalescing agents and the like. Usually, about from 0.25 to 4% by weight of dispersing agents and about from 0.5 to 5% by weight of bodying agents are used.

The coating compositions of this invention are prepared by blending the silicone resin, the ester-nitrile-acid copolymer together with the other aforementioned optional additives with an aqueous dispersion of the polytetrafluoroethylene. Preferably, a solution of the silicone resin, for example, a 15 to 75% solution in water-immiscible solvent such as, for example, xylene, toluene, benzene, mineral spirits, hexane, cyclohexane, petroleum, naphtha or the like, is emulsified with water before it is blended with the other constituents. Compositions in which the aforementioned organic solvent amounts to less than about 30%, and preferably 5 to 20% of the total aqueous composition are preferred. Also, preferably the aforementioned ester-nitrile-acid copolymer is added as an aqueous dispersion.

The coating compositions of this invention are usually applied at concentrations ranging from 25 to 70, and preferably 35 to 60% by weight of solids. They can be applied by any of the conventional coating techniques such as spray, brush, dip or roller coating techniques. Preferably, wire is coated by standard dip coating techniques. Wet coatings of the compositions of this invention are heated to a temperature of at least 340° C., and preferably 360 to 400° C. for a period ranging from a few seconds to several minutes. This heat treatment fuses the polytetrafluoroethylene particles to a continuous, smooth, uniform coating. Wire is usually passed continuously through an oven held at a temperature sufficient to heat the wet coatings to a temperature within the aforementioned ranges.

The coating compositions of this invention can be applied to any of a wide variety of heat-resistant substrates such as, for example, glass and other ceramics and metals such as iron, steel, copper, aluminum, brass, bronze, nickel, tungsten and alloys thereof. They are particularly suited for coating single and multi-strand wire used as magnet wire and hook-up wire and instranded cables, generators, motors, computors, and the like. The compositions of this invention are characterized by their ability to be applied in thick, uniform coatings which are characterized by their outstanding heat, chemical and electrical resistance, durability and impermeability. Coatings of the compositions of this invention have the added advantage that they can be stripped readily from wire where terminals are soldered or otherwise connected therewith. Coating compositions of this invention can be applied to yield smooth uniform coatings as much as two or more times as thick as conventional coating compositions formed from aqueous dispersions of polytetrafluoroethylene.

The following examples are intended to illustrate this invention and not to limit it in any way. Parts and percentages are by weight unless otherwise indicated.

EXAMPLE 1

*Preparation of Coating Composition*

A coating composition is prepared by blending 76.7 parts of an aqueous dispersion of a copolymer of about 32% of butyl acrylate, 63% of acrylonitrile and 5% of methacrylic acid containing a heat-reactive phenol-formaldehyde resin with 948.1 parts of an aqueous dispersion of polytetrafluoroethylene at a temperature of about 80 to 85° F., then adding thereto 94.0 parts of an emulsion of heat-reactive silicone resin.

The aqueous polytetrafluoroethylene dispersion contains about 60% by weight of colloidal polytetrafluoroethylene and about 3.1% of dispersing agent containing primarily sodium lauryl sulfate.

The terpolymer dispersion is prepared by first charging about 0.1 part of sodium bisulfite and about 0.5 part of sodium lauryl sulfate dispersing agent to a reaction vessel flushed with nitrogen and containing about 200 parts of the deoxygenated water. Next, a mixture of 63 parts of acrylonitrile, 32 parts of butyl acrylate and 5 parts of methacrylic acid are charged thereto, then 0.3 part of potassium persulfate is added. The reaction mixture is held at 60° C. for two hours until the polymerization reaction is substantially complete. Next, the resulting product is neutralized to a pH of about 6.0 with ammonium hydroxide, held at 60° C. for 30 minutes and cooled to room temperature. A 66% aqueous solution of water-dilutable, heat-reactive phenol formaldehyde resin ("Bakelite" BRL–1100) is added thereto to yield an aqueous dispersion containing 28.8% of terpolymer and 3.2% of phenol-formaldehyde resin. Finally, the dispersion is further neutralized with ammonium hydroxide to a pH of about 7.2, heated at about 85° C. for about 30 minutes and again cooled to room temperature.

The silicone resin emulsion, which contains about 40% of silicone resin, is prepared by emulsifying a mixture of 33.4 parts of "DC–801" resin and 40 parts of "DC–803" resin in a solution of 2.3 parts of sodium lauryl sulfate dispersing agent in 24.3 parts of water. "DC–801" resin, which is a 60% solution in xylene of heat-reactive silicone resin, has a specific gravity of 1.04 to 1.06, a viscosity at 25° C. of 100 to 300 centipoises and a maximum drying time at 250° C. of one hour. "DC–803" resin, which is a 50% solution in xylene of heat-reactive silicone resin, has a specific gravity at 25° C. of 1.02 to 1.04, a viscosity at 25° C. of 100 to 200 centipoises and a maximum drying time at 100° C. of one hour.

The preparation of the coating composition of this invention is completed by adjusting the blend prepared as described above to a pH of about 7 with about 3 parts of 28% aqueous ammonium hydroxide, adding thereto 30 parts of a 1% aqueous solution of colloidal, water-sensitive, gum bodying agent ("Carbopol" 934) then diluting the resulting product with about 130 parts of water.

The product prepared as described above contains, per 100 parts of film-forming materials, 90 parts of polytetrafluoroethylene, 6 parts of heat-reactive silicone resin, 3.6 parts of terpolymer and 0.4 part of phenol-formaldehyde resin. The aforementioned film-forming materials constitute about 49% of the total composition.

*Evaluation of Coating Composition*

25 A.W.G. copper wire is passed continuously into the composition described above, withdrawn vertically therefrom at a rate of 20 feet per minute and passed through a 4-foot, hot-air oven held at 510° C. A smooth uniform coating having a wall thickness of about 0.9 mil is deposited on the wire. The coating process is repeated 6 times to yield a total coating thickness of about 5 to 6 mils. By comparison, when a similar composition not containing either heat-reactive silicone resin or ester-nitrile-acid copolymer is applied to wire as just described, a coating thickness of less than about 0.5 mil per pass is obtained.

The dielectric strength of wire coated with the composition of this invention as described above is tested by tightly twisting two coated wires together and measuring the voltage necessary to short through the coating on the two twisted wires. The coated wire has a dielectric strength of about 1,000 volts per mil of coating. The abrasion resistance of the coating is tested by using a General Electric scrape abrasion test which comprises dragging the cylindrical surface of a 0.016 inch diameter needle under a load of 50 grams back and forth at an angle of 90° to the axis of the wire. A 5-mil thick coating of the composition of this invention described above withstands about 400–700 strokes. The heat resistance of the product is tested by holding the wire in an oven at 350° C. for 1,000 hours. No loss in flexibility or cracking in the coating is observed in this test.

EXAMPLE 2

A coating composition is prepared by blending 304 parts of an aqueous dispersion of colloidal polytetrafluoroethylene similar to that described in Example 1 with 34 parts of the heat-reactive silicone resin emulsion described in that example. Next, 10 parts of an ammoniacal 1% solution of the bodying agent used in Example 1 are added thereto followed by 7.5 parts of an aqueous colloidal silica suspension ("Ludox" LS). The coating composition is completed by adding to the resulting mixture 20 parts of an aqueous dispersion of 5.76 parts of the terpolymer described in Example 1 containing 0.64 part of the water-soluble, heat-reactive, phenol-formaldehyde resin used in the example. The resulting product contains, per 100 parts of the film-forming constituents, about 90 parts of polytetrafluoroethylene, 6.8 parts of heat-reactive silicone resin, 2.9 parts of terpolymer and 0.3 part of heat-reactive phenol-formaldehyde resin. These film-forming materials constitute about 53% of the total composition.

An 18 A.W.G. copper wire is dip coated in the composition described above, drawn vertically therefrom at the rate of 6 feet per minute and passed through a 12-foot oven held at a temperature of about 427° C. Six coats of the composition are applied to yield a coating about 4 mils thick. The resulting coating is smooth, uniform and crack-free, has a dielectric strength of 850 to 1,000 volts per mil and excellent abrasion and heat resistance.

EXAMPLE 3

A coating composition is prepared by blending 133 parts of a 60% aqueous colloidal dispersion of polytetrafluoroethylene containing 1.8% of sodium lauryl sulfate dispersing agent with 26.6 parts of an aqueous dispersion containing 38.5% of a terpolymer of butyl acrylate, acrylonitrile and methacrylic acid similar to that described in Example 1. Next, 25 parts of an emulsion formed from 80 parts of a 50% solution in toluene of heat-reactive silicone resin, 3 parts of sodium lauryl sulfate dispersing agent and 17 parts of water are added thereto. The 50% solution of the silicone resin (R-62 Silicone) has a specific gravity at 25° C. of 1.0, a viscosity at 25° C. of 75 to 200 centipoises and a flash point (Cleveland Open Cup) of 55° F. The coating composition described above is completed by adding thereto 10 parts of a 2% aqueous solution of ammonium alginate and reducing the resulting product with about 22 parts of water. The resulting product has about 51% of film-forming constituents containing, per 100 parts thereof, about 80 parts of polytetrafluoroethylene, 10 parts of heat-reactive silicone resin and 10 parts of terpolymer. This product has properties substantially similar to those of the products of the preceding example.

EXAMPLE 4

116.7 parts of the aqueous colloidal dispersion of polytetrafluoroethylene described in Example 3 is blended with 39.0 parts of the ester-nitrile-acid terpolymer dispersion used in that example. Next, 125 parts of an emulsion formed by dispersing 75 parts of a 20% solution in a mixture of toluene and xylene of heat-reactive silicone resin (Resin 81727) in a solution of 3 parts of sodium lauryl sulfate in 47 parts of water is blended therewith. The silicone resin contains about 0.65 methyl and 0.65 phenyl groups per silicon atom. The coating composition is completed by adding thereto 10 parts by weight of a 2% aqueous solution of ammonium alginate to yield a product containing about 34% of film-forming materials. Per 100 parts of film-forming materials, the composition of this example contains 70 parts of polytetrafluoroethylene, 15 parts of heat-reactive silicone resin and 15 parts of terpolymer. The product of this example has properties similar to those of the product of Example 3.

EXAMPLE 5

A coating composition is prepared by blending 150 parts of a 60% aqueous dispersion of colloidal polytetrafluoroethylene containing 1.8% of sodium lauryl sulfate dispersing agent, 21.5 parts of the terpolymer dispersion described in Example 1 and 77.5 parts of a silicone-resin emulsion. The silicone resin emulsion is prepared by blending 66.7 parts of a 60% solution in toluene of heat-reactive silicone resin ("DC-840" resin), 3.3 parts of sodium lauryl sulfate dispersing agent and 30 parts of water. The 60% solution of the heat-reacted silicone resin has a specific gravity at 25° C. of 1.05 to 1.07, a viscosity at 25° C. of 15 to 25 centipoises and a maximum drying time at 200° C. of 1 hour. The coating composition is completed by adding thereto 8 parts of 1% solution of methyl cellulose in water and adjusting the pH thereof to 8 with ammonium hydroxide. The resulting product has about 54% of film-forming materials containing, per 100 parts thereof, about 90 parts of polytetrafluoroethylene, 7 parts of heat-reactive silicone resin and 3 parts of terpolymer.

EXAMPLE 6

A copolymer is prepared from an emulsion of 60 parts of butyl acrylate, 35 parts of acrylonitrile, and 5 parts of methacrylic acid, neutralized with ammonium hydroxide, blended with heat-reactive phenol-formaldehyde resin ("Bakelite" BRL-1100) and again neutralized with ammonium hydroxide as described in Example 1. The resulting dispersion contains 32% of film-forming materials of which 90% is terpolymer and 10% is phenol-formaldehyde resin. The terpolymer dispersion is blended with an aqueous colloidal dispersion of polytetrafluoroethylene similar to that described in Example 1, then an emulsion of heat-reactive silicone resin similar to that described in Example 1 is blended therewith. Finally, about 4% based on the total weight of composition of 2% ammonium alginate body agent is added thereto to yield a composition containing about 49% of film-forming materials, each 100 parts of which contain about 90 parts of polytetrafluoroethylene, 6 parts of heat-reactive silicone resin, 3.6 parts of terpolymer and 0.4 part of phenol-formaldehyde resin. This product has properties similar to those of the products of the preceding examples.

Instead of the terpolymer used above, the following copolymers, prepared by similar procedures, can be used in equal weights to yield products having substantially similar properties: (1) copolymer of 40 parts of ethyl acrylate, 55 parts of acrylonitrile and 5 parts of methacrylic acid, (2) copolymer of 32 parts of butyl acrylate, 63 parts of acrylonitrile and 5 parts of acrylic acid, (3) copolymer of 33 parts of butyl acrylate, 65 parts of acrylonitrile and 2 parts of crotonic acid, (4) copolymer of 29 parts of butyl acrylate, 57 parts of acrylonitrile, 4 parts of methacrylic acid and 10 parts of styrene, (5) copolymer of 32 parts of ethyl acrylate, 63 parts of acrylonitrile, 3 parts of methacrylic acid and 2 parts of glycidyl methacrylate, (6) copolymer of 20 parts of octyl acrylate, 70 parts of acrylonitrile and 10 parts of acrylic acid and (7) copolymer of 35 parts of ethyl acrylate, 55 parts of acrylonitrile, 5 parts of crotonic acid and 5 parts of methacrylic acid.

I claim:
1. A coating composition which comprises an aqueous dispersion having as essential film-forming constituents 100 parts by weight of a blend of
   (A) at least about 65 parts by weight of polytetrafluoroethylene,
   (B) about 3–30 parts by weight of a water-dispersible, heat-reactive silicone resin which is a poly(organosiloxane) bearing hydrocarbon substituents selected from the group consisting of alkyl and aryl radicals, and
   (C) about 2–15 parts by weight of at least one copolymer of at least one ester of a monoethylenically unsaturated monocarboxylic acid bearing an alpha-methylene group, at least one nitrile of such an acid and at least one alpha-monoethylenically unsaturated monocarboxylic acid.

2. The coating composition of claim 1 in which the silicone resin is a poly(organosiloxane) bearing both alkyl and aryl substituents and is present in an amount of about 5–10 parts by weight as an emulsified solution in a liquid, water-immiscible hydrocarbon solvent for said silicone resin.

3. The coating composition of claim 2 in which the silicone resin is a methyl-phenyl silicone resin containing about 1 to 2 hydrocarbon substituents per silicon atom and about 0.5 to 2 methyl substituents per phenyl substituent, said coating composition containing in admixture therewith up to about 40% by weight, based on the weight of said copolymer, of a water-dilutable, heat-reactive condensation resin of formaldehyde with at least one of the class consisting of phenols, urea and melamine.

4. The coating composition of claim 3 in which the copolymer is a copolymer of about 15 to 65% by weight of at least one ester of a monoethylenic unsaturated monocarboxylic acid, bearing an alpha-methylene group, with a 1–8 carbon atom alkanol, about from 30 to 80% by weight of acrylonitrile and about from 2 to 15% by weight of at least one monoethylenically unsaturated monocarboxylic acid bearing an alpha-methylene group; the condensation resin being a phenol-formaldehyde resin in an amount of 5–20% based on the weight of said copolymer.

5. A substrate having a fused coating of the composition of claim 2.

6. An electrical conductor having a fused coating of the composition of claim 2.

7. A process which comprises forming an aqueous emulsion of a solution in a water-immiscible hydrocarbon solvent of about 3 to 30 parts by weight of a water-dispersible, heat-reactive silicone resin which is a poly(organosiloxane) bearing hydrocarbon substituents from the group consisting of alkyl and phenyl radicals, and blending said emulsion and an aqueous dispersion containing about 2 to 15 parts by weight of at least one copolymer of at least one ester of a monoethylenically unsaturated monocarboxylic acid bearing an alpha-methylene group, at least one nitrile of such an acid and at least one alpha-monoethylenically unsaturated monocarboxylic acid with an aqueous dispersion containing at least about 65 parts by weight of polytetrafluoroethylene to form a blend containing 100 parts by weight of film-forming materials.

References Cited in the file of this patent

UNITED STATES PATENTS

| | | |
|---|---|---|
| 2,258,222 | Rochow | Oct. 7, 1941 |
| 2,710,290 | Safford et al. | June 7, 1955 |
| 2,787,603 | Sanders | Apr. 2, 1957 |
| 2,825,706 | Sanders | Mar. 4, 1958 |
| 2,976,257 | Dawe et al. | Mar. 21, 1961 |